(12) United States Patent
Duan et al.

(10) Patent No.: US 9,950,602 B2
(45) Date of Patent: Apr. 24, 2018

(54) INSTALLATION STRUCTURE FOR LITHIUM BATTERY BOX OF ELECTRIC VEHICLE

(71) Applicant: AIMA TECHNOLOGY GROUP CO., LTD., Tianjin (CN)

(72) Inventors: Hua Duan, Tianjin (CN); Shiyong Wang, Tianjin (CN); Zongyou Li, Tianjin (CN); Yinghua Hu, Tianjin (CN); Jing Wang, Tianjin (CN); Wei Tian, Tianjin (CN)

(73) Assignee: AIMA TECHNOLOGY GROUP CO., LTD., Tianjin (CN)

( * ) Notice: Subject to any disclaimer, the term of this patent is extended or adjusted under 35 U.S.C. 154(b) by 32 days.

(21) Appl. No.: 15/336,338

(22) Filed: Oct. 27, 2016

(65) Prior Publication Data

US 2017/0190243 A1 Jul. 6, 2017

(30) Foreign Application Priority Data

Jan. 4, 2016 (CN) .................... 2016 2 0016129 U

(51) Int. Cl.
| | |
|---|---|
| *B60K 1/04* | (2006.01) |
| *B62M 6/90* | (2010.01) |
| *B62K 19/40* | (2006.01) |
| *H01M 2/10* | (2006.01) |
| *H01M 10/0525* | (2010.01) |

(52) U.S. Cl.
CPC ................ *B60K 1/04* (2013.01); *B62K 19/40* (2013.01); *B62M 6/90* (2013.01); *H01M 2/1083* (2013.01); *H01M 10/0525* (2013.01); *H01M 2220/20* (2013.01)

(58) Field of Classification Search
CPC .. B60K 1/04; H01M 2/1083; H01M 10/0525; H01M 2220/20
See application file for complete search history.

(56) References Cited

U.S. PATENT DOCUMENTS

| | | | | |
|---|---|---|---|---|
| 5,798,702 A * | 8/1998 | Okamoto | ................. | B62M 6/45 180/220 |
| 6,946,217 B2 * | 9/2005 | Singer | ................... | H01M 2/344 429/178 |
| 7,393,125 B1 * | 7/2008 | Lai | ........................... | B62M 6/90 280/281.1 |
| 7,934,576 B2 * | 5/2011 | Munksoe | ............... | B62K 11/00 180/220 |

(Continued)

*Primary Examiner* — Jacob B Meyer
(74) *Attorney, Agent, or Firm* — Greer, Burns & Crain, Ltd.

(57) ABSTRACT

The installation structure for the lithium battery box of the electric vehicle includes a battery box body and a vehicle frame oblique beam, where an insertion hole is produced in a front end of the battery box body; an installation groove is produced in the vehicle frame oblique beam; a front battery box base is installed in a front installation groove; an insertion bolt driven through a key is arranged on the front battery box base; where an upwards-bulged arc-shaped limit groove is produced in the middle of the lower cover in the axis of the box body; the installation groove of the vehicle frame oblique beam is an installation groove with a front opening and a rear opening; a limit bulge adaptive to the arc-shaped limit groove is produced on a groove bottom of the installation groove.

5 Claims, 3 Drawing Sheets

(56) References Cited

U.S. PATENT DOCUMENTS

| | | | |
|---|---|---|---|
| 8,727,367 B2* | 5/2014 | Talavasek | B62K 3/02 |
| | | | 280/274 |
| 8,881,857 B2* | 11/2014 | Binggeli | B62K 19/30 |
| | | | 180/206.1 |
| 8,979,110 B2* | 3/2015 | Talavasek | B62M 6/90 |
| | | | 280/279 |
| 8,979,111 B2* | 3/2015 | Dal Pozzo | B62J 11/00 |
| | | | 180/68.5 |
| 9,580,141 B2* | 2/2017 | Talavasek | H01M 2/1016 |
| 9,611,003 B1* | 4/2017 | Yu | B62M 6/90 |
| 2006/0186158 A1* | 8/2006 | Ishikawa | B62J 23/00 |
| | | | 224/419 |
| 2010/0237585 A1* | 9/2010 | Binggeli | B62K 19/30 |
| | | | 280/288.4 |
| 2011/0042156 A1* | 2/2011 | Vincenz | B62H 5/001 |
| | | | 180/206.5 |
| 2012/0313344 A1* | 12/2012 | Dal Pozzo | B62J 11/00 |
| | | | 280/288.4 |
| 2013/0241170 A1* | 9/2013 | Talavasek | B62M 6/90 |
| | | | 280/279 |

* cited by examiner

INSTALLATION STRUCTURE FOR LITHIUM BATTERY BOX OF ELECTRIC VEHICLE

TECHNICAL FIELD

The present disclosure relates to the field of electric vehicle accessories, and particularly relates to an installation structure for a lithium battery box of an electric vehicle.

BACKGROUND

With popularization and continuous development of electric vehicles, requirements of people for the electric vehicles are higher and higher. The electric vehicles meet not only sensory and aesthetic demands of people from appearance but also use demands of people from functions and practicability thereof.

There are two existing installation manners for a lithium battery of an electric vehicle, one is front-mounted installation, and the other one is rear-mounted installation. A front-mounted battery box is generally installed on an oblique beam of a vehicle frame, that is, an installation groove provided with a groove wall at periphery is produced in the oblique beam, and the battery box internally filled with a lithium battery is embedded in the installation groove; and in order to enhance stability of the vehicle frame, a cross beam is further arranged on the oblique beam generally, so that the cross beam, the oblique beam and a saddle vertical tube together form a subtriangular shape with stability. However, when taking the battery box out of interior of the installation groove, the battery box needs to be lifted so as to be higher than the groove wall of the installation groove so that to take out the battery box; however, taking-out for the lithium battery is influenced if the cross beam above the oblique beam is designed to be low; moreover, it is more inconvenient due to a high dead weight of the lithium battery; and aesthetic property of the whole vehicle is influenced if the cross beam is designed to be high.

SUMMARY

The objective of the present disclosure is to provide an installation structure for a lithium battery box of an electric vehicle, which is scientific and reasonable in structural design, simple in structure, convenient to detach and install, beneficial to vehicle frame design, high in aesthetic property, and capable of meeting use demands of users.

The present disclosure solves the technical problem thereof through following technical solutions.

An installation structure for a lithium battery box of an electric vehicle includes a battery box body and a vehicle frame oblique beam, where the box body is composed of an upper cover, a lower cover, end covers and sidewalls; the upper cover and the lower cover are arranged at top and bottom in parallel; the end covers are arranged at left ends and right ends of the upper cover and the lower cover; the sidewalls are arranged at front ends and rear ends of the upper cover and the lower cover; an insertion hole is produced in the end cover at the left end of the battery box body; an installation groove is produced in the vehicle frame oblique beam; an insertion bolt driven through a key is arranged at one side of a left end of the installation groove; and locking and fixation for the battery box body and the vehicle frame oblique beam are realized by inserting the insertion bolt into the insertion hole; where an upwards-bulged arc-shaped limit groove is produced in the middle of the lower cover in the axis of the box body; the installation groove of the vehicle frame oblique beam is an installation groove with a front opening and a rear opening; a limit bulge adaptive to the arc-shaped limit groove is produced on a groove bottom of the installation groove; and installation for the battery box body and a sectional material of the vehicle frame is realized through embedment for the arc-shaped limit groove and the limit bulge.

Moreover, one or more grooves arranged along a lengthwise direction of the arc-shaped limit groove are produced in the arc-shaped limit groove; a U-shaped spring sheet is fixedly installed in each groove through a screw; and two ends of each U-shaped spring sheet are abutted against the limit bulge of the installation groove.

Moreover, a wiring cavity of the hollow sectional material is composed of three cavities.

Moreover, five groups of battery supports arranged along a lengthwise direction of the lower cover are arranged on the lower cover in the battery box body; and eight battery packs connected through nickel strips are fixed on each group of the battery supports.

Moreover, an electric quantity display plate and a switch button for controlling switch-on and switch-off of the battery are arranged on the upper cover of the battery box body; and a battery protection plate connected with the electric quantity display plate through a signal wire is arranged in the battery box body.

The installation structure for the lithium battery box of the electric vehicle of the present disclosure has following advantages and beneficial effects.

1. According to the installation structure for the lithium battery box of the electric vehicle, by designing a traditional form of completely embedding the battery box into the installation groove as a form of embedding the limit bulge produced on the groove bottom of the installation groove onto the bottom of the battery box, a movement range during installation and taking-out for the battery box is greatly reduced, so that installation and detachment for the battery are not limited by the cross beam of the vehicle frame, and are more convenient; and meanwhile, design of the vehicle frame is also not limited by the installation and taking-out for the battery box, so that a design space of the vehicle frame is more free, and performance and appearance requirements are met.

2. According to the installation structure for the lithium battery box of the electric vehicle, by additionally configuring the U-shaped spring sheets on the bottom of the battery box, the key needs to be rotated to retreat the insertion bolt at first when taking the battery. At this moment, the battery box is bounced due to effect of the U-shaped spring sheets, so that the taking-out for the battery box is facilitated.

3. According to the installation structure for the lithium battery box of the electric vehicle, by designing the vehicle frame oblique beam as a hollow structure, wiring of the whole vehicle is facilitated, so that the appearance of the whole vehicle is more regular and beautiful.

4. According to the installation structure for the lithium battery box of the electric vehicle, by additionally configuring the electric quantity display plate with an electric quantity display function on the battery box, connecting the electric quantity display plate with the battery protection plate through the signal wire, and adopting communication protocols for control, the electric quantity display plate is capable of displaying electricity utilization condition of the battery in real time, so that a driver can charge according to use condition of the battery to ensure normal use. During use, if the switch button is long pressed, the electric quantity display plate sends a switch-on command to the battery protection plate to switch on the battery; and if the switch is lightly touched, the battery sends current electric quantity to the electric quantity display plate to display electric quantity.

5. The structure of the present disclosure is scientific and reasonable in structural design, has advantages of simple structure, convenient to detach and install, beneficial to vehicle frame design, high aesthetic property, and capable of meeting use demands of users, and is a highly-innovative installation structure for a lithium battery box of an electric vehicle.

A LIST OF REFERENCE NUMERALS

Figure 1:
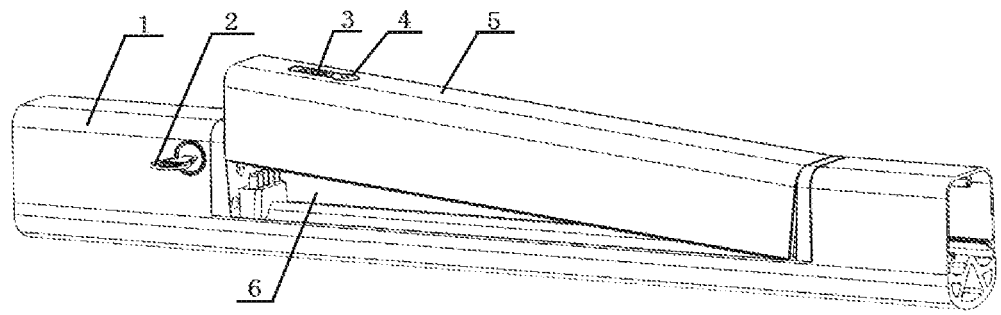
FIG. 1 is a schematic structural diagram showing the present disclosure.
Figure 2:
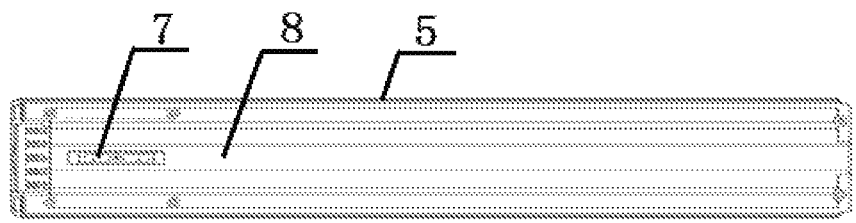
FIG. 2 is a bottom view showing a battery box body of the present disclosure.
Figure 3:
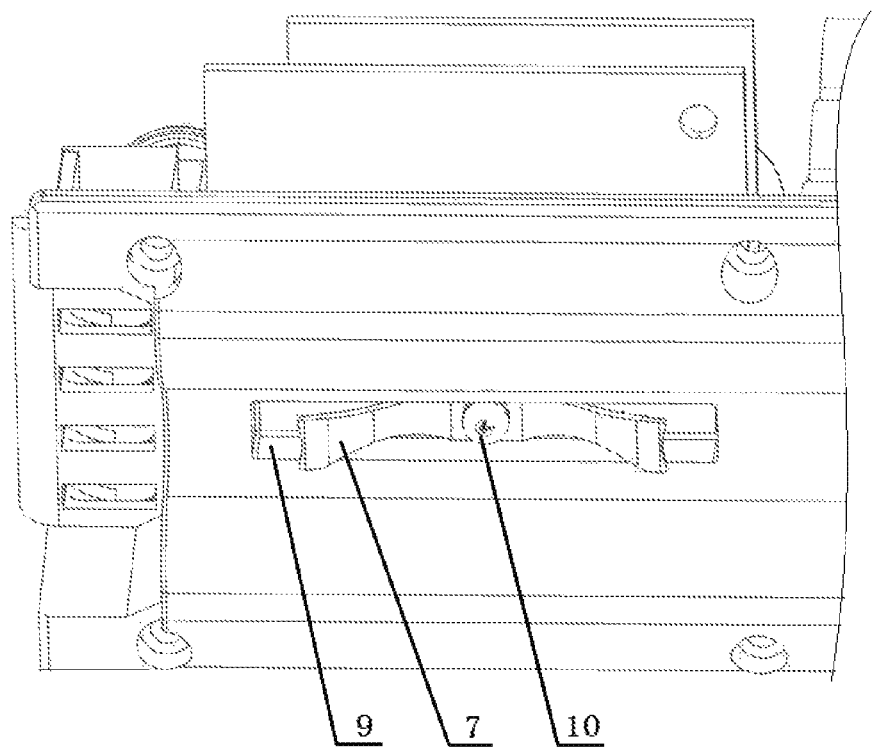
FIG. 3 is a partial enlarged view showing a bottom of the battery box body of the present disclosure (side plates and an upper cover are omitted)
Figure 4:
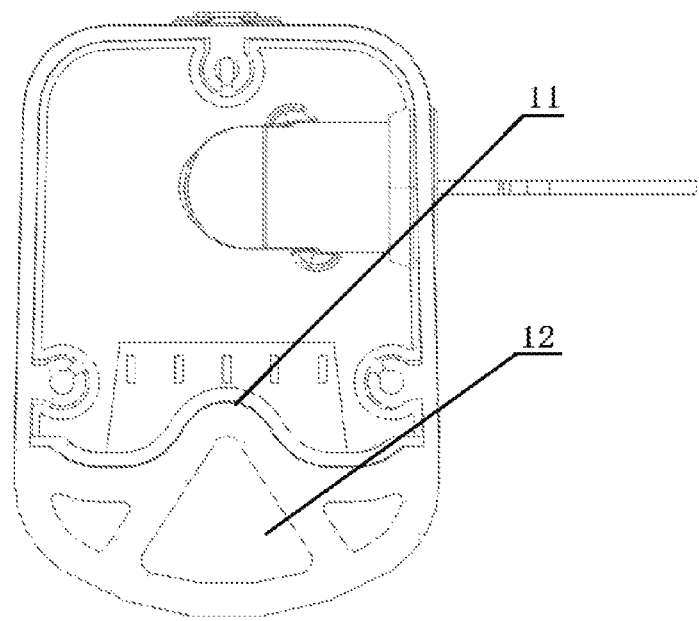
FIG. 4 is a left view showing the present disclosure.
Figure 5:
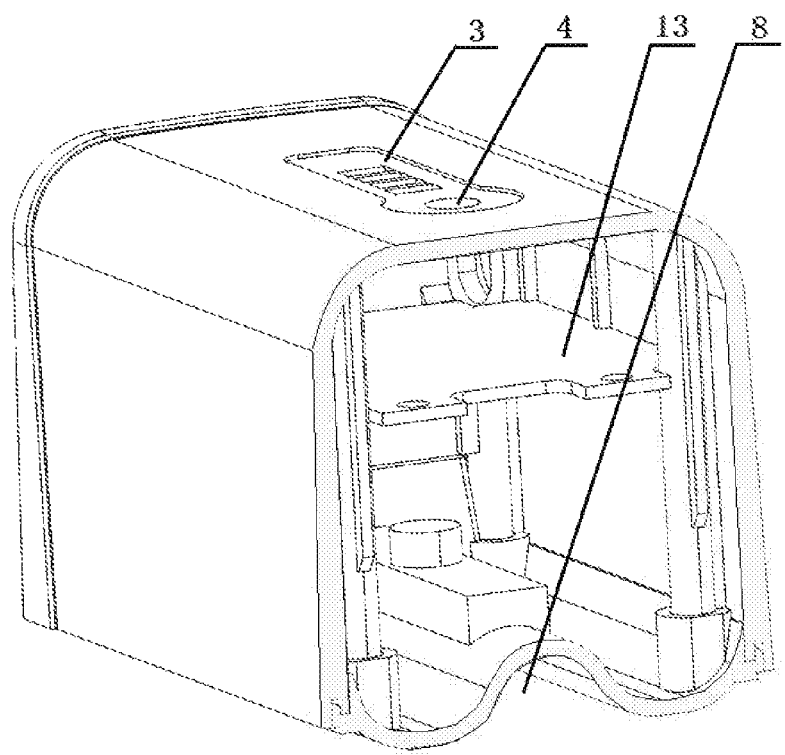
FIG. 5 is a section view showing a battery box body of the present disclosure.
Figure 6:
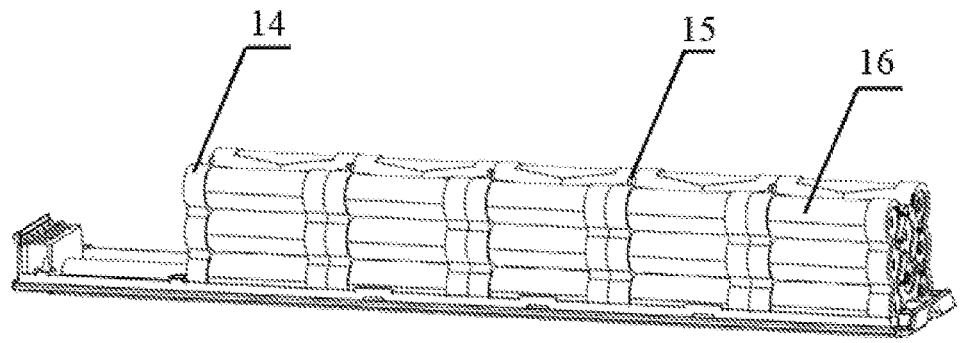
FIG. 6 is a schematic structural diagram showing a battery pack assembly of the present disclosure.
Figure 7:
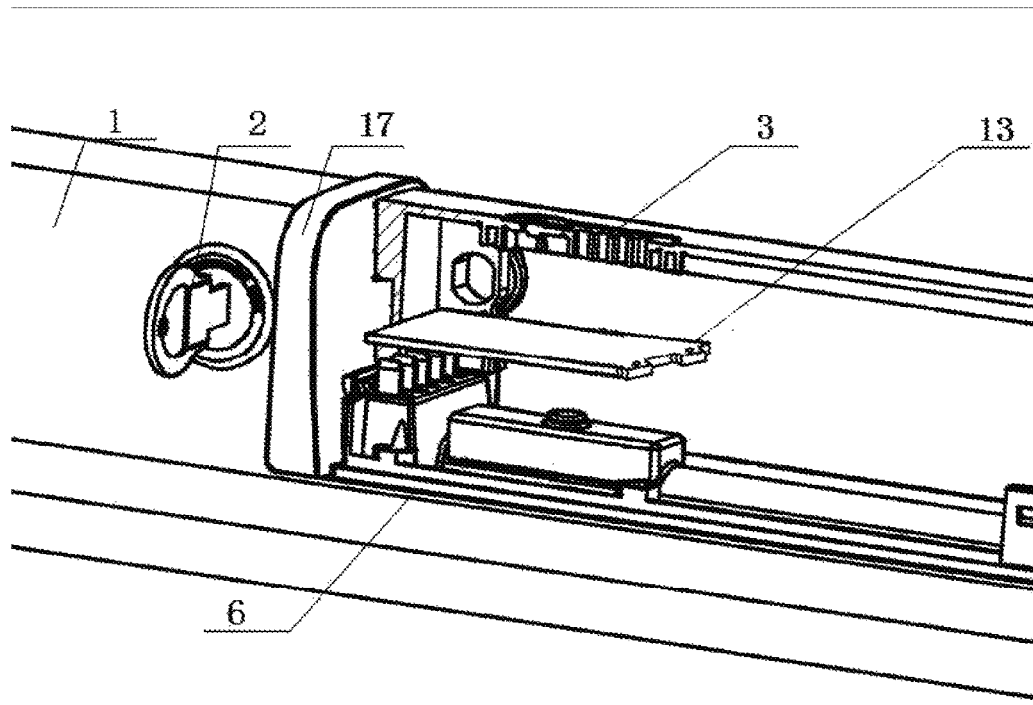
FIG. 7 is an enlarged, fragmentary perspective view of the oblique beam with the battery box removed.

1: Vehicle frame oblique beam; 2: Key; 3: Electric quantity display plate; 4: Switch button; 5: Battery box body; 6: Installation groove; 7: U-shaped spring sheet; 8: Arc-shaped limit groove; 9: Groove; 10: Screw; 11: Limit bulge; 12: Wiring cavity; 13: Battery protection plate; 14: Battery support; 15: Nickel strip; 16: Battery; 17: Front battery box base; 20: Electric quantity display plate.

DETAILED DESCRIPTION

The present disclosure is further described below in detail through specific embodiments, and the embodiments below are merely descriptive rather than limitative, and cannot be used for limiting the protection scope of the present disclosure.

An installation structure for a lithium battery box of an electric vehicle includes a battery box body 5 and a vehicle frame oblique beam 1, where the box body is composed of an upper cover, a lower cover, end covers and sidewalls; the upper cover and the lower cover are arranged at top and bottom in parallel; the end covers are arranged at left ends and right ends of the upper cover and the lower cover; the sidewalls are arranged at front ends and rear ends of the upper cover and the lower cover; an insertion hole is produced in the end cover at the left end of the battery box body; an installation groove 6 is produced in the vehicle frame oblique beam; an insertion bolt driven through a key 2 is arranged at one side of a left end of the installation groove; and locking and fixation for the battery box body and the vehicle frame oblique beam are realized by inserting the insertion bolt into the insertion hole. Innovations of the installation structure for the lithium battery box of the electric vehicle lie in that the installation groove is an installation groove with a front opening and a rear opening; an upwards-bulged arc-shaped limit groove 8 is produced in the middle of the lower cover in the axis of the box body; a limit bulge 11 adaptive to the arc-shaped limit groove is produced on a groove bottom of the installation groove of the vehicle frame oblique beam; and installation for the battery box body and a sectional material of the vehicle frame is realized through embedment for the arc-shaped limit groove and the limit bulge.

One or more grooves 9 arranged along a lengthwise direction of the arc-shaped limit groove are produced in the arc-shaped limit groove; a U-shaped spring sheet 7 is fixedly installed in each groove through a screw 10; and two ends of each U-shaped spring sheet are abutted against the limit bulge of the installation groove.

The vehicle frame oblique beam is composed of a hollow sectional material; an assembly cavity is formed in an upper part of the hollow sectional material; a wiring cavity 12 is formed in a lower part of the hollow sectional material; and the wiring cavity is composed of three cavities with different shapes, thereby enhancing strength of the hollow sectional material.

Five groups of battery supports 14 arranged along a lengthwise direction of the lower cover are arranged on the lower cover in the battery box body; and eight battery packs 16 connected through nickel strips 15 are fixed on each group of the battery supports.

An electric quantity display plate 3 and a switch button 4 for controlling switch-on and switch-off of the battery are arranged on the upper cover of the battery box body; and a battery protection plate 13 connected with the electric quantity display plate through a signal wire is arranged in the battery box body.

According to the present disclosure, by designing a traditional form of completely embedding the battery box into the installation groove as a form of embedding the limit bulge produced on the groove bottom of the installation groove onto the bottom of the battery box, a movement range during installation and taking-out for the battery box is greatly reduced, so that installation and detachment for the battery are not limited by the cross beam of the vehicle frame, and are more convenient; and meanwhile, design of the vehicle frame is also not limited by the installation and taking-out for the battery box, so that a design space of the vehicle frame is more free, and performance and appearance requirements are met. By additionally configuring the U-shaped spring sheets on the bottom of the battery box, the key needs to be rotated to retreat the insertion bolt at first when taking the battery. At this moment, the battery box is bounced due to effect of the U-shaped spring sheets, so that the taking-out for the battery box is facilitated. By designing the vehicle frame oblique beam as a hollow structure, wiring of the whole vehicle is facilitated, so that appearance of the whole vehicle is more regular and beautiful. By additionally configuring the electric quantity display plate with an electric quantity display function on the battery box, connecting the electric quantity display plate with the battery protection plate through the signal wire, and adopting communication protocols for control, the electric quantity display plate is capable of displaying electricity utilization condition of the battery in real time, so that a driver can charge according to use condition of the battery to ensure normal use. During use, if the switch button is long pressed (for 10 seconds), the electric quantity display plate sends a switch-on command to the battery protection plate to switch on the battery; and if the switch is lightly touched, the battery sends current electric quantity to the electric quantity display plate to display electric quantity.

Although the embodiments and accompanying drawings of the present disclosure are disclosed for the purpose of illustration, those skilled in the art can understand that various substitutions, variations and modifications are all possible without departing from the spirit and scope of the present disclosure and the attached claims. Therefore, the scope of the present disclosure is not limited to the present disclosure contained in the embodiments and the accompanying drawings.

What is claimed is:

1. An installation structure for a lithium battery box of an electric vehicle, comprising:
    a battery box body and a vehicle frame oblique beam, wherein the box body is composed of an upper cover and a lower cover, wherein the upper cover and the lower cover are arranged at a top and a bottom of the box body in parallel;
    an insertion hole is produced in a front end of the box body;
    an installation groove is produced in the vehicle frame oblique beam;
    a front battery box base is installed in the installation groove;
    an insertion bolt driven through a key is arranged on the front battery box base, wherein locking and fixation for the battery box body and the vehicle frame oblique beam are realized by inserting the insertion bolt into the insertion hole, and
    wherein an upwards-bulged arc-shaped limit groove is produced in the middle of the lower cover in the axis of the box body; the installation groove of the vehicle frame oblique beam has a front opening and a rear opening; a limit bulge adaptive to the arc-shaped limit groove is produced on a groove bottom of the installation groove; and installation for the battery box body and a sectional material of the vehicle frame is realized through embedment for the arc-shaped limit groove and the limit bulge,
    wherein one or more grooves arranged along a lengthwise direction of the arc-shaped limit groove are produced in the arc-shaped limit groove of the battery box, a U-shaped spring sheet is fixedly installed in each groove through a screw, and two ends of each U-shaped spring sheet are abutted against the limit bulge of the installation groove.

2. The installation structure for the lithium battery box of the electric vehicle according to claim 1, wherein, the vehicle frame oblique beam is composed of a hollow sectional material; an assembly cavity is formed in an upper part of the hollow sectional material; and a wiring cavity is formed in a lower part of the hollow sectional material.

3. The installation structure for the lithium battery box of the electric vehicle according to claim 2, wherein, the wiring cavity of the hollow sectional material is composed of three cavities.

4. The installation structure for the lithium battery box of the electric vehicle according to claim 1, wherein, five groups of battery supports arranged along a lengthwise direction of the lower cover are arranged on the lower cover in the battery box body; and eight battery packs connected through nickel strips are fixed on each group of the battery supports.

5. The installation structure for the lithium battery box of the electric vehicle according to claim 1, wherein, an electric quantity display plate and a switch button for controlling switch-on and switch-off of the battery are arranged on the upper cover of the battery box body; and a battery protection plate connected with the electric quantity display plate through a signal wire is arranged in the battery box body.

* * * * *